Figure 1:
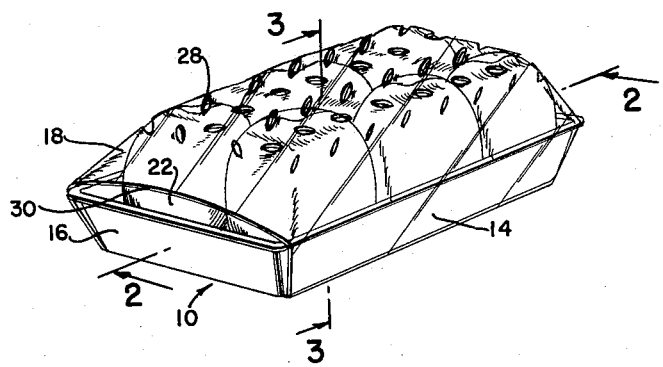

Jan. 9, 1962 T. B. KENNEDY 3,016,131
FOOD CONTAINER
Filed Jan. 25, 1960 2 Sheets-Sheet 1

INVENTOR
Thomas B. Kennedy

BY Karl W. Flocks

ATTORNEY

Jan. 9, 1962 T. B. KENNEDY 3,016,131
FOOD CONTAINER
Filed Jan. 25, 1960 2 Sheets-Sheet 2

INVENTOR
Thomas B. Kennedy

BY Karl W. Flocks
ATTORNEY.

United States Patent Office 3,016,131
Patented Jan. 9, 1962

3,016,131
FOOD CONTAINER
Thomas B. Kennedy, Stamford, Conn., assignor to Diamond National Corporation, New York, N.Y., a corporation of Delaware
Filed Jan. 25, 1960, Ser. No. 4,247
8 Claims. (Cl. 206—45.33)

This invention relates to a container and has for one of its objects the provision of a container having a semi-rigid support for objects that are to form the contents of the container, and a flexible, transparent sheet or wrapper that is secured to the support as a unit therewith, and which transparent wrapper is so formed that it will conform to the shape of the objects packaged therein and yet will adhere closely to the edges of the support and may be secured to the support so as to enable securing the same to itself in enclosing or encircling relation to the support and its contents.

The use of thermosealing plastic material such as regenerated cellulose, cellophane, polyethylene, chlorinated rubber and rubber hydrochloride, in the packaging of goods is popular for the reason that the plastic material is transparent, thus enabling the contents of the package to be seen and at the same time protecting said contents. Of course, the invention is not limited to transparent material, since translucent or opaque materials may also be used. Where rigid or semi-rigid containers or supports for the objects to be packaged have been used, the usual method of enclosing the container and its contents where the thermosealing material is used, has been to provide a strip of said material which is wrapped thereabout to totally enclose the container and its contents and the thermosealing material is heat sealed onto itself on the bottom of the container.

This structure obviously has its limitations, especially when packaging produce, and an improvement has been suggested wherein the flexible sheet and the container are provided as a unit with one end thereof attached to the bottom of the container. Once the container is filled, the sheet is merely swung over the contents and thence under the container to overlap the one end and is secured thereto.

This structure also has its limitations in that when the width of the sheet and the container are the same and when the sheet is wrapped about the produce, there is a gap between the unattached sides of the sheet and the container. This gap is troublesome in that the produce can fall out of the gap when the package is inverted. Even when the wrapper is pulled more tightly around the container to lessen the gaps, the sheet of cellophane which lacks flexibility still does not extend over the end fruits in such a way as to prevent it from being pulled out of the ends of the package.

It is therefore an object of the present invention to provide an improved container for rapidly and efficiently forming into a package that encloses and securely holds the contents on a semi-rigid support having a transparent and flexible cover.

Another object of the present invention is to provide an improved container having a transparent and flexible wrapper adapted to encircle a semi-rigid support holding the contents in such a manner that the wrapper closely follows the contour of the support and contents without forming large gaps at the unattached edges.

A still further object of the invention is to provide an improve wrapper adapted to encircle a container and its contents and which closely follows the contour of the contents without forming large gaps at the unattached edges.

Another object of the present invention is to provide an improved package including a container its contents extending thereabove, and a wrapper adapted to closely follow the contour of the contents without forming large gaps at the unattached edges.

A still further object of the present invention is to provide an improved wrapper adapted to encircle a container and its contents which is cut and scored, so that as it is tightened around the container and its contents, it will follow the contour of the contents without forming large gaps at the unattached edges.

Other objects and advantages will appear in the drawings and in the description.

Figure 2:
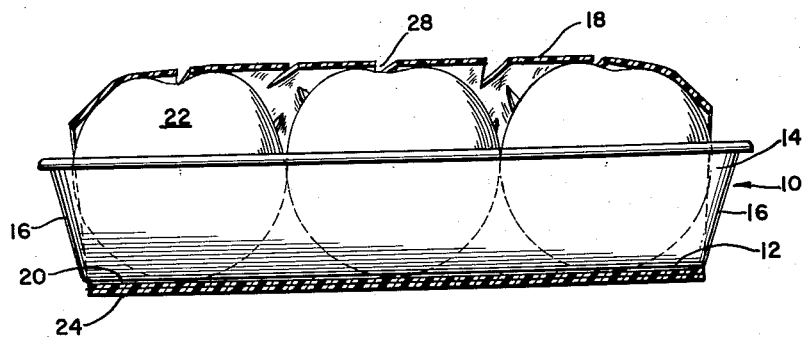
Figure 3:
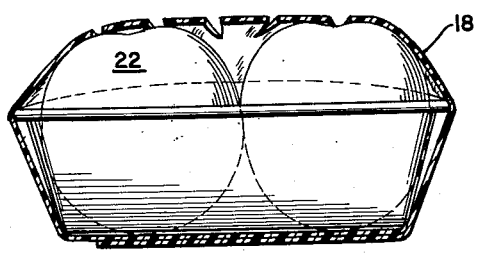
Figure 4:
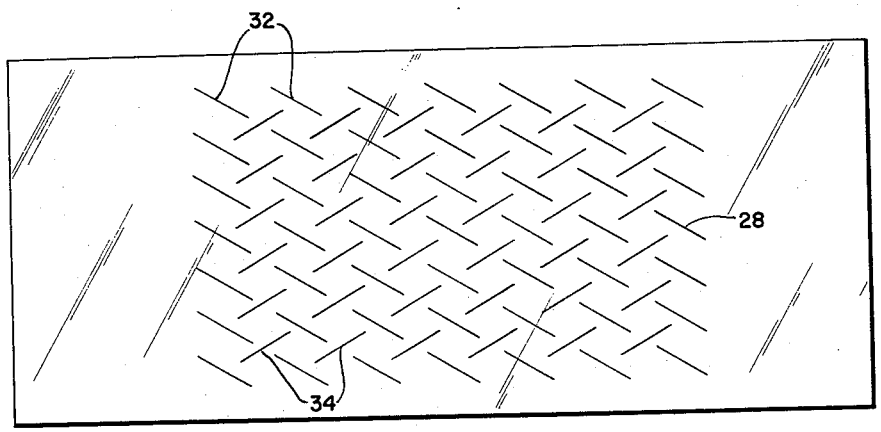
Figure 5:
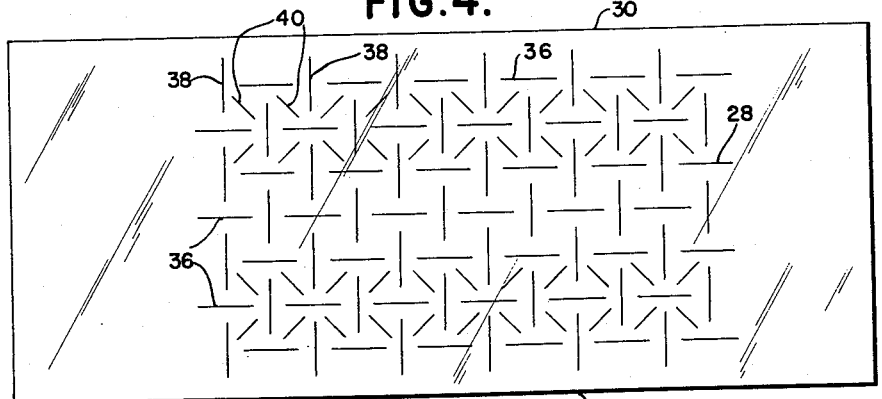
Figure 6:
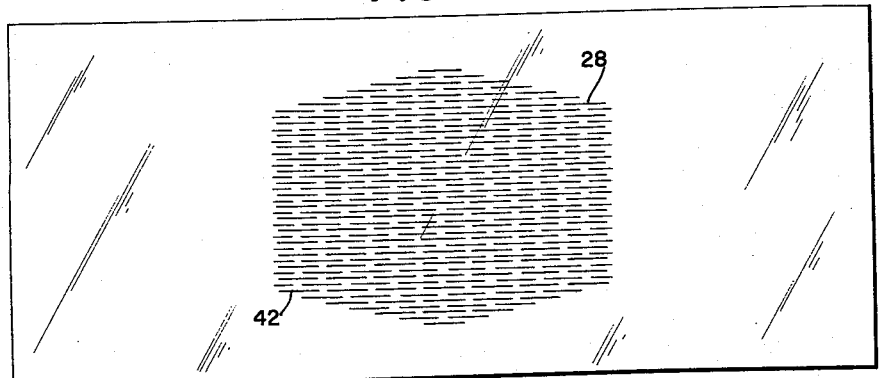

In the drawings,
FIG. 1 is a perspective view of the container and contents;
FIG. 2 is a cross-sectional view taken along the line 2—2 of FIG. 1;
FIG. 3 is a cross-sectional view taken along the line 3—3 of FIG. 1;
FIGS. 4, 5 and 6 are top plan views of various modifications of wrappers in accordance with this invention before they are attached to the container.

In accordance with this invention, the wrapper is provided with a plurality of slits in the area that comes into contact with the contents of the container so that in encircling the container and contents contained therein the wrapper will follow the contour of the contents closely by opening of the slits. In this manner the wrapper will adhere closely to the produce being packaged without excessive wrinkling in the central area and yet will closely approach the container on each side to prevent the large gaps that would otherwise occur.

Referring to the drawings, the container illustrated in FIG. 1 consists of a semi-rigid support generally designated 10, having a bottom wall 12, side walls 14, and walls 16 and an open top. This support may be used for the packaging of various food products and is especially suitable for packaging produce.

The wrapper 18 used for encircling the container and the produce contained therein is made of a transparent, thermoplastic, thin, flexible sheet material, such as cellophane, polyethylene and the like. One end thereof 20 is secured to and underlies the bottom wall 12 of the support 10. This end portion that so underlies the bottom wall 12 of the support may be cemented, glued or otherwise suitably secured to the support, and while the latter is usually made of cardboard or molded from paper pulp, it may be of any suitable material, such as wooden or plastic berry boxes. The support 10 and the wrapper 18 may be secured together as a unit for shipping, handling filling and closing purposes.

The remainder of the wrapper 18 that projects from the bottom extends away from one of the sidewalls 14, and the width of the strip is preferably substantially equal to the distance between the end walls 16, hence none of the wrapper projects outwardly of the end walls of the support.

The wrapper 18 is of sufficient length to extend completely around the support 10 and any products or objects to be packaged therein, such as, for example, tomatoes, lemons, oranges, or any other fruits or vegetables 22. The end portion 24 of the wrapper 18 that is opposite the end portion 20 is adapted to overlap the latter to a more or less degree according to the size of the objects 22, hence the end portions 20 and 24 can be heat sealed together after wrapping the wrapper around the support 10 and the objects 22.

The central portion of the wrapper 18 intermediate the end portions 20 and 24, is provided with a plurality of slits 28. The configuration of the slits 28 may be varied as well as the lengths thereof to conform to the type of produce to be used.

As illustrated in FIG. 4, the slits 28 are arranged in rows with alternate rows being identical in configuration. All of the slits in each row are parallel to one another. Between the identical alternate rows are provided rows of slits 32 arranged at an angle to the slits 34 of the neighboring rows and staggered with respect thereto. The slits 32 in alternate rows are in alignment, and the slits 34 in alternate rows are likewise in alignment.

As illustrated in FIG. 5, a more complex arrangement of slits is shown. In this configuration there are a plurality of aligned horizontal slits 36 in rows, adjacent horizontal slits in each row being separated by a vertical slit 38, with a staggered arrangement between adjacent rows of horizontal slits 36. In addition, angular slits 40 are provided in the spaces between the remaining slits in the areas adjacent the outer edges 30 of the sides of the wrapper.

The form of wrapper shown in FIG. 6 constitutes a plurality of rows of horizontal slits 42 with rows thereof in staggered arrangement.

In each case, the slits may be opened by transverse pressure on the wrapper caused by the wrapping of the container and contents as shown in FIG. 1 so that the outer edges 30 approach the upper edge of end walls 16. Thus, the wrapper remains flat until used. When the wrapper is wrapped tightly over the support and the objects packaged therein, the slits in the intermediate portion of the wrapper will open up to follow the contour of the objects while the unslitted outer edges will follow the top surface of the end walls 16 making only a small gap at the sides which will not permit removal of the contents.

The slits may be placed in the wrapper in any convenient manner, such as by cutting and stamping.

When the serrated portion of the wrapper is placed over the produce and stretched accordingly, a pleasing diamond shape, ribbon-like effect results.

The use of polyethylene for the wrapper is preferred in that it is sufficiently strong to prevent tearing when the slits are separated.

It is contemplated that a roll of the wrapper material can be made with the slits at the proper intervals thereon, and the wrappers of the proper length can be cut therefrom as they are attached to the bottom surface of the container.

The configurations of slits shown in FIGS. 4 to 6 are examples; any suitable configurations may be used depending on the produce to be packaged. It is obvious that larger slits can be used for packaging grapefruit than would be used in packaging grapes or plums.

It will be obvious to those skilled in the art that various changes may be made without departing from the spirit of the invention and therefore the invention is not limited to what is shown in the drawings and described in the specification, but only as indicated in the appended claims.

What is claimed is:

1. A container adapted for packaging objects which extend above the height of the container comprising a support having a horizontal bottom wall, upstanding side walls and end walls integral with said bottom wall and an open upper side, said side walls, end walls and bottom wall being of semi-rigid material, a rectangular thin flexible sheet of wrapping material having a width substantially the same as the width of said bottom wall and a length sufficient to extend across the bottom wall, over the side walls, across the open upper side including the objects adapted to be supported on said bottom wall, and again across the bottom wall, said wrapping material being secured at one end thereof to the underside of said bottom wall to fixedly hold said sheet on said support in a predetermined position for wrapping about said support and its contents, a plurality of slits extending through the intermediate portion of said sheet which is adapted to extend over the open upper side of said support and the objects therein, whereby when the sheet is wrapped tightly around the support and its contents the slits will open up to closely follow the contour of the objects extending above the support and the side edges of the sheet will be positioned adjacent to the upper surface of the end walls of the support.

2. A container in accordance with claim 1 wherein said sheet is of thermosealing material to enable the ends thereof to be heat-sealed together.

3. A container in accordance with claim 1 wherein said outer edges of the intermediate portion of said sheet are continuous, said slits being confined to the central portion thereof.

4. A container in accordance with claim 1 wherein said slits are arranged in a plurality of parallel rows whereby when the slits open up, a ribbon-like effect results.

5. A package comprising a support having a horizontal bottom wall and upstanding side walls and end walls integral with said bottom wall and an open upper side, said side walls, end walls and bottom wall being of semi-rigid material, objects to be packaged resting on said bottom wall and extending upwardly above the height of the support, a rectangular thin flexible sheet of wrapping material having a width substantially the same as the width of said bottom wall and a length sufficient to extend across the bottom wall, over the side walls, across the open upper side including the packaged objects, and again across the bottom wall, said wrapping material being wrapped around said support and contents, and secured at its ends into underlying lapping relation on the underside of said bottom wall, a plurality of slits extending through the intermediate portion of said sheet which extends over the open upper side of said support and the objects therein, said sheet of wrapping material being tightly wrapped around the support and its contents so that the slits are opened and the wrapping material closely follows the contour of the objects extending above said support and the edges of the sheet are positioned adjacent to the upper surface of the end walls of the support to prevent removal of the objects packaged therein.

6. A package in accordance with claim 5 wherein said sheet is of thermosealing material and the ends thereof are heat-sealed together.

7. A package in accordance with claim 5 wherein said outer edges of the intermediate portion of said sheet are continuous, said slits being confined to the central portion thereof.

8. A package in accordance with claim 5 wherein said slits are arranged in a plurality of parallel rows whereby when the slits open up, a ribbon-like effect results.

References Cited in the file of this patent

UNITED STATES PATENTS

| | | |
|---|---|---|
| 635,143 | Moffitt | Oct. 17, 1899 |
| 1,955,707 | Greve | Apr. 17, 1934 |
| 2,106,921 | Sykes | Feb. 1, 1938 |
| 2,763,422 | Oakes | Sept. 18, 1956 |
| 2,767,099 | Sloan | Oct. 16, 1956 |

FOREIGN PATENTS

| | | |
|---|---|---|
| 1,196,788 | France | May 25, 1959 |